United States Patent
Worsham, II et al.

(10) Patent No.: US 11,136,136 B2
(45) Date of Patent: Oct. 5, 2021

(54) SYSTEM AND METHOD FOR FLIGHT MODE ANNUNCIATION

(71) Applicant: Textron Innovations Inc., Providence, RI (US)

(72) Inventors: Robert Earl Worsham, II, Weatherford, TX (US); Morganne Cody Klein, Fort Worth, TX (US); Christopher M. Bothwell, Grapevine, TX (US); Luke Dafydd Gillett, Grapevine, TX (US); Jillian Samantha Alfred, Fort Worth, TX (US); Sung Kyun Kim, Bedford, TX (US); Stephanie Baynham, Tacoma Park, MD (US); Troy Caudill, Burleson, TX (US)

(73) Assignee: Textron Innovations Inc., Providence, RI (US)

( * ) Notice: Subject to any disclaimer, the term of this patent is extended or adjusted under 35 U.S.C. 154(b) by 190 days.

(21) Appl. No.: 15/978,646

(22) Filed: May 14, 2018

(65) Prior Publication Data

US 2019/0161203 A1    May 30, 2019

Related U.S. Application Data

(60) Provisional application No. 62/593,038, filed on Nov. 30, 2017.

(51) Int. Cl.
*B64D 43/00* (2006.01)
*B64D 45/00* (2006.01)
(Continued)

(52) U.S. Cl.
CPC .......... *B64D 45/00* (2013.01); *B64C 13/0421* (2018.01); *B64C 13/18* (2013.01);
(Continued)

(58) Field of Classification Search
USPC .............................................. 701/3
See application file for complete search history.

(56) References Cited

U.S. PATENT DOCUMENTS 6,314,343 B1 * 11/2001 Adams ................ G05D 1/0055
                                                                244/1 R
7,203,577 B2   4/2007 Gunn et al.
(Continued)

FOREIGN PATENT DOCUMENTS

EP    1244947 B1    3/2005
EP    2107002 A2    10/2009

OTHER PUBLICATIONS

Garmin G1000 Integrated Flight Deck Pilot's Guide, Cessna Nav III, 190-00498-08 Rev A., Copyright 2004-2011, 2013 Garmin Ltd. (Year: 2013).*

(Continued)

*Primary Examiner* — James M McPherson
(74) *Attorney, Agent, or Firm* — Slater Matsil, LLP

(57) ABSTRACT

In an embodiment, a method of indicating flight modes of a rotorcraft includes: detecting a change in flight mode of the rotorcraft from a previous flight mode to an active flight mode, the active flight mode and the previous flight mode each being from one of a first subset or a second subset of a plurality of flight modes; determining whether the active flight mode and the previous flight mode are from different subsets of the plurality of flight modes; and updating one or more flight mode indicators on an instrument panel of the rotorcraft in response to the active flight mode and the previous flight mode being from different subsets of the plurality of flight modes.

23 Claims, 10 Drawing Sheets

(51) Int. Cl.
*B64C 13/04* (2006.01)
*B64C 13/50* (2006.01)
*B64C 27/57* (2006.01)
*B64C 13/18* (2006.01)
*G01C 23/00* (2006.01)

(52) U.S. Cl.
CPC ............ *B64C 13/503* (2013.01); *B64C 27/57* (2013.01); *B64D 43/00* (2013.01); *G01C 23/005* (2013.01)

(56) References Cited

U.S. PATENT DOCUMENTS

| | | | |
|---|---|---|---|
| 9,650,125 B2 | 5/2017 | Goldborne et al. | |
| 2006/0004498 A1* | 1/2006 | Gunn | G01C 23/00 701/10 |
| 2012/0072056 A1* | 3/2012 | Hasan | B64C 13/00 701/3 |
| 2015/0022479 A1* | 1/2015 | Nikolic | G01C 23/005 345/173 |
| 2016/0347442 A1* | 12/2016 | Golborne | B64C 27/04 |
| 2018/0164123 A1* | 6/2018 | Pineo | G01C 21/20 |
| 2020/0164957 A1* | 5/2020 | Xu | B64C 1/30 |

OTHER PUBLICATIONS

Garmin G1000H Integrated Flight Deck Pilot's Guide, Cessna Bell 407GX, 190-01255-00 Rev B., Copyright 2011, Garmin Ltd. (Year: 2011).*

* cited by examiner

241

245

243

SYSTEM AND METHOD FOR FLIGHT MODE ANNUNCIATION

PRIORITY CLAIM AND CROSS-REFERENCE

This application claims the benefit of U.S. Provisional Application No. 62/593,038, entitled "System and Method for Flight Mode Annunciation," filed on Nov. 30, 2017, which application is incorporated herein by reference.

TECHNICAL FIELD

The present invention relates generally to a system and method for automated flight control in a rotorcraft, and, in particular embodiments, to a system and method for flight mode annunciation.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

In an embodiment, a rotorcraft includes: a rotor system producing thrust along an axis of the rotorcraft; a flight control computer operable to control flight of the rotorcraft along the axis according to an active flight mode of a plurality of flight modes; pilot flight controls electrically coupled to the flight control computer, the flight control computer operable to select a first selected flight mode from a first subset of the plurality of flight modes according to input from the pilot flight controls; and an instrument panel electrically coupled to the flight control computer, the flight control computer operable to receive a flight mode selection signal from a flight director of the instrument panel in response to the flight director selecting a second selected flight mode from a second subset of the plurality of flight modes, the second subset different from the first subset; where the flight control computer is configured to: set the active flight mode to one of the first selected flight mode or the second selected flight mode in response to the flight director being coupled to the flight control computer; display a first indicator on the instrument panel in response to the active flight mode being set to the first selected flight mode from the first subset of the plurality of flight modes; display a second indicator on the instrument panel in response to the active flight mode being set to the second selected flight mode from the second subset of the plurality of flight modes, the second indicator different from the first indicator; and control flight of the rotorcraft along the axis according to the active flight mode.

In some embodiments of the rotorcraft, the flight control computer selects the first selected flight mode according to input from the pilot flight controls. In some embodiments of the rotorcraft, the pilot flight controls include a control stick coupled to a control stick detent sensor, the first selected flight mode selected according to a stick detent signal from the control stick detent sensor. In some embodiments of the rotorcraft, the pilot flight controls include a control stick coupled to a control stick movement sensor, the first selected flight mode selected according to a stick movement signal from the control stick movement sensor. In some embodiments, the rotorcraft further includes aircraft sensors, where the flight control computer selects the first selected flight mode according to sensor samples from the aircraft sensors. In some embodiments, the rotorcraft further includes an engine control unit (ECU), where the flight control computer selects the first selected flight mode according to data from the ECU. In some embodiments of the rotorcraft, the flight control computer selects the first selected flight mode according to data from the instrument panel. In some embodiments of the rotorcraft, the flight control computer selects the first selected flight mode according to states of control loops of a fly-by-wire control system of the rotorcraft. In some embodiments of the rotorcraft, the first indicator is not shown on the instrument panel in response to the active flight mode being set to the second selected flight mode. In some embodiments of the rotorcraft, the first indicator and the second indicator are color coded according to the flight director being coupled to the flight control computer.

In an embodiment, a method of indicating flight modes of a rotorcraft includes: detecting a change in flight mode of the rotorcraft from a previous flight mode to an active flight mode, the active flight mode and the previous flight mode each being from one of a first subset or a second subset of a plurality of flight modes; determining whether the active flight mode and the previous flight mode are from different subsets of the plurality of flight modes; and updating one or more flight mode indicators on an instrument panel of the rotorcraft in response to the active flight mode and the previous flight mode being from different subsets of the plurality of flight modes.

In some embodiments of the method, updating the one or more flight mode indicators includes: displaying a first indicator of the flight mode indicators in response to the active flight mode being from the first subset of the plurality of flight modes; and displaying a second indicator of the flight mode indicators in response to the active flight mode being from the second subset of the plurality of flight modes, the second indicator being different from the first indicator. In some embodiments of the method, the change in flight mode occurs in response to a change in position of pilot flight controls of the rotorcraft. In some embodiments of the method, the active flight mode is selected from the first subset of the plurality of flight modes in response to the change in position of the pilot flight controls. In some embodiments of the method, the change in flight mode occurs in response to selection of the active flight mode through a flight director. In some embodiments of the method, the active flight mode is selected from the second subset of the plurality of flight modes in response to the selection of the active flight mode with through the flight director. In some embodiments of the method, the one or more flight mode indicators are color coded according to whether the flight director is coupled to a flight control computer of the rotorcraft. In some embodiments of the method, the flight mode indicators include a first indicator and a second indicator, and where updating the one or more flight mode indicators includes: displaying the first indicator and hiding the second indicator in response to the flight director being inactive; displaying the first indicator and the second indicator in response to the flight director being active but not coupled to the flight control computer; and displaying the second indicator and hiding the first indicator in response to the flight director being active and coupled to the flight control computer. In some embodiments of the method, the one or more flight mode indicators include a single indicator for an axis of the rotorcraft, and where the active flight mode is shown in the single indicator for the axis regardless of whether the active flight mode is from the first subset or the second subset of the plurality of flight modes.

In an embodiment, a method of indicating flight modes of a rotorcraft includes: determining whether a flight director is coupled to a flight control system of the rotorcraft; detecting a change of a flight mode of the rotorcraft from a previous flight mode to a current flight mode, the current flight mode and the previous flight mode being from one of a first subset or a second subset of a plurality of flight modes, the current flight mode being from the second subset when the flight director is coupled to the flight control system, the current flight mode being from the first subset when the flight director is not coupled to the flight control system; and updating one or more indicators in response to detecting the change of the flight mode, the one or more indicators being color coded according to the flight director being coupled to the flight control system.

In some embodiments of the method, the one or more indicators include a first indicator corresponding to the first subset of the plurality of flight modes, and a second indicator corresponding to the second subset of the plurality of flight modes, and where updating the one or more indicators includes changing the color of the one or more indicators. In some embodiments of the method, the first indicator is a first color when the flight director is not coupled to the flight control system. In some embodiments of the method, the second indicator is a first color when the flight director is coupled to the flight control system. In some embodiments of the method, the first indicator is a first color and the second indicator is a second color when the flight director is active but is not coupled to the flight control system.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
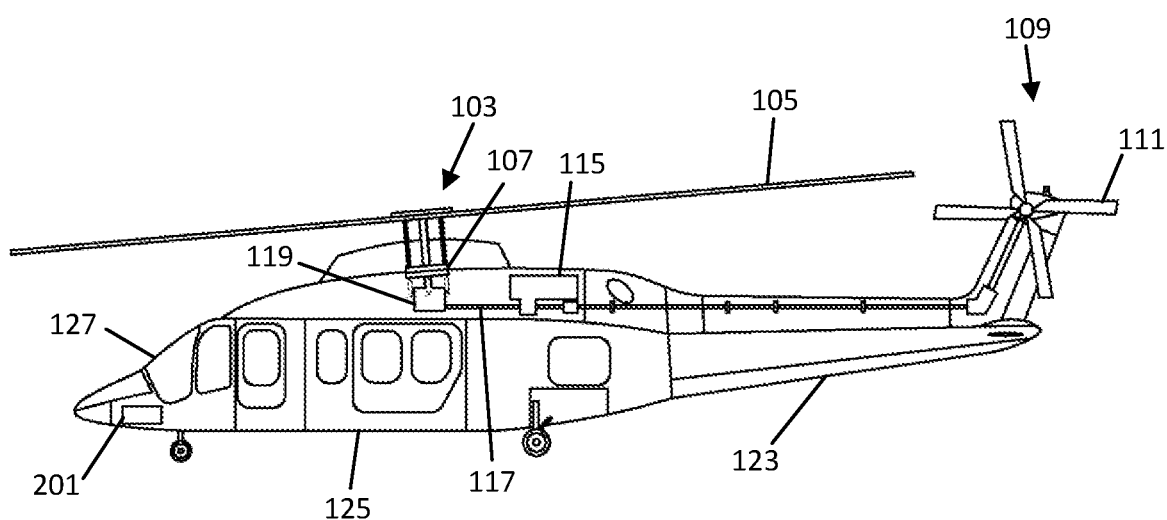
FIG. 1 illustrates a rotorcraft, according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

FIG. 1 illustrates a rotorcraft 100 according to some embodiments. The rotorcraft lot has a main rotor system 103, which includes a plurality of main rotor blades 105. The pitch of each main rotor blade 105 may be controlled by a swashplate 107 in order to selectively control the attitude, altitude and movement of the rotorcraft lot. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft lot. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the main rotor system 103 and the anti-torque system through a main rotor transmission 119 and a tail rotor transmission 121, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft lot. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft lot may be operated remotely, in which case the cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 100 could be configured as an unmanned vehicle, in which case the cockpit 127 could be eliminated entirely in order to save space and cost.

Figure 2:
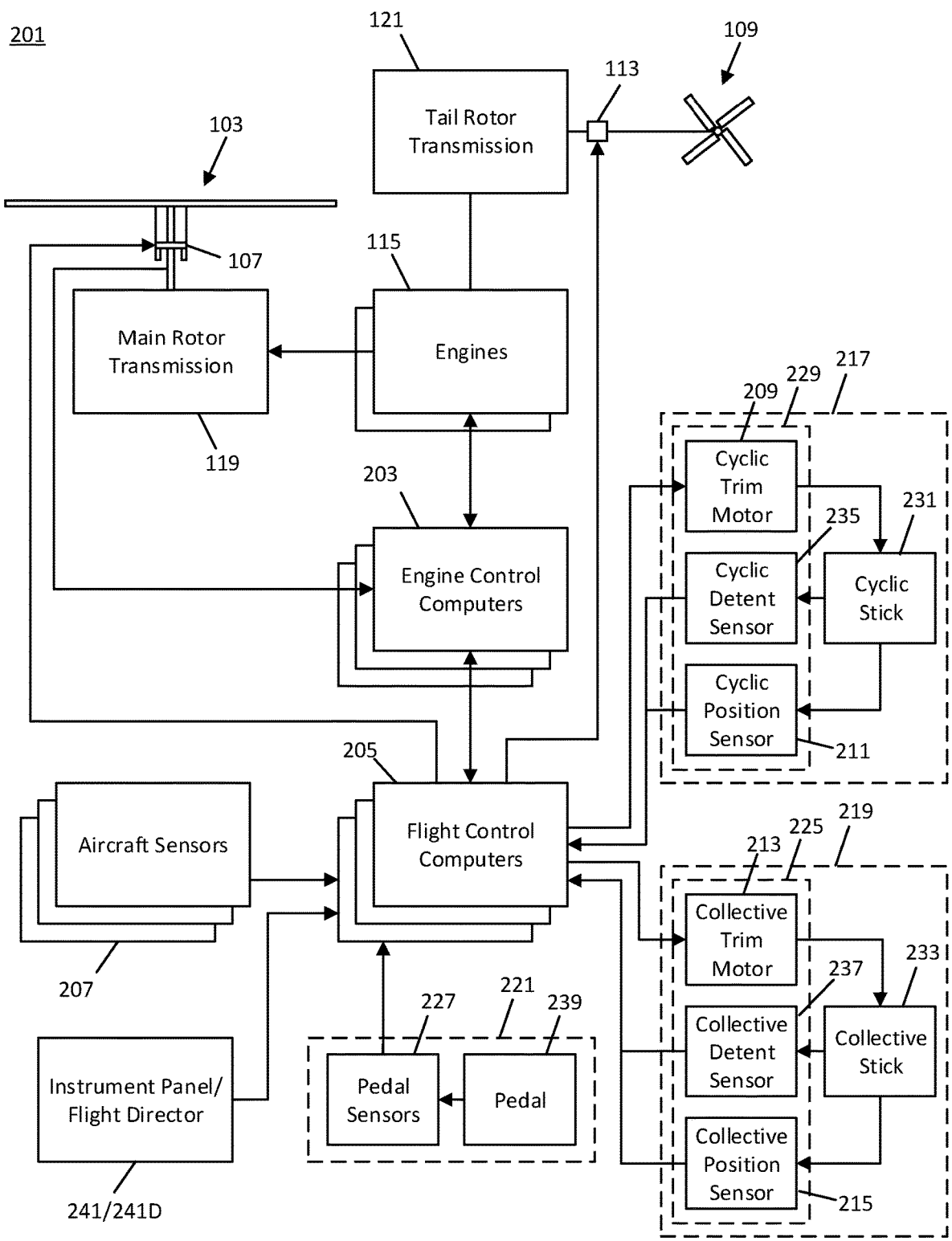
FIG. 2 illustrates a fly-by-wire flight control system for a rotorcraft, according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241. As further explained below, a flight director 241D may be accessed through the instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such a measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other aircraft sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measure roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The trim motors 209 and 213 may drive the cyclic stick 231 and collective stick 233, respectively, to suggested positions. The trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

The cyclic control assembly 217 and/or the collective control assembly 219 may further include at least one beep switch (not shown) on the cyclic stick 231 and/or the collective stick 233. The beep switch is generally used to adjust steady-state functionality of the rotorcraft 101 when displaced away from a neutral position toward a deflected position. The beep switch may be deflected within a plane along an x-axis and along a y-axis. The beep switch may simultaneously have non-zero deflection values for both the x-axis and the y-axis. In some embodiments, the beep switch is configured to return to a center-x/center-y neutral location when the pilot removes manipulative force from, or is no longer in contact with, the beep switch. In this sense, the beep switch operates in similar fashion and function as a joystick or control column (e.g., an input device having a stick that pivots on a base and reports an angle or direction of deflection away from a neutral position).

Figure 3:
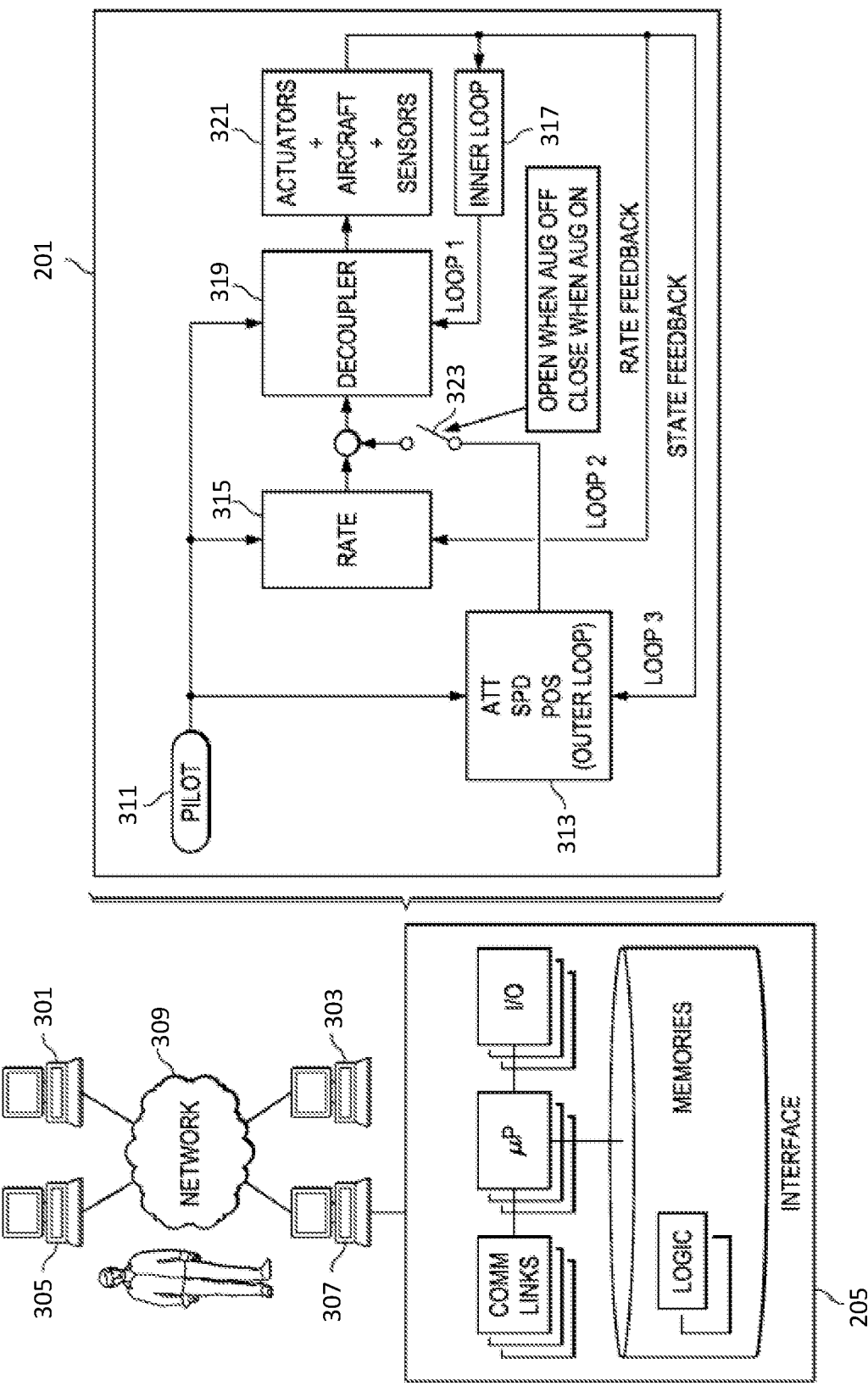
FIG. 3 representatively illustrates a three-loop flight control system, according to some embodiments.

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 101 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 121, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 323 may be provided to turn outer loop flight augmentation on and off, the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

The outer loop 313 controls flight of the rotorcraft 101 along each axis of the rotorcraft lot. The outer loop 313 may control flight along each axis using one of a plurality of available flight modes. Flight modes for each axis may include modes for maintaining a position, heading, speed, attitude, rate, and the like, or may include modes for performing functionality such as hovering or autorotation. The currently active flight mode for each axis may be automatically selected by the FCCs 205, or may be manually selected by the pilot with the instrument panel 241. The flight mode selected by the pilot may override the flight mode selected by the FCCs 205.

The flight modes automatically selected by the FCCs 205 may be different from the flight modes manually selected with the instrument panel 241. In an embodiment, the available flight modes for each axis include a first subset and a second subset, and the currently active flight mode for an axis is selected from one of these subsets. The FCCs 205 may automatically select a flight mode for the axis from the first subset of flight modes, but not from the second subset of flight modes. The instrument panel 241 may be used to select a flight mode for the axis from the second subset of flight modes, but not from the first subset of flight modes. In an embodiment, the first subset of the plurality of flight modes are flight modes implementing various fly-by-wire control laws (sometimes referred to herein as "CLAWS"), and the second subset of the plurality of flight modes are different flight modes implemented by a flight director 241D accessed through the instrument panel 241.

In an embodiment, the first and second subset of flight modes may have some overlap in functionality, but may accomplish that functionality differently. For example, both the first and second subset may have flight modes for maintaining longitudinal airspeed of the rotorcraft lot, but may implement those flight modes differently in the outer loop 313. In an embodiment, the flight modes of the fly-by-wire control laws (e.g., the first subset) may include more flight modes than the flight modes supported by the flight director (e.g., the second subset). For example, the second subset of flight modes may include modes for a flight director and/or autopilot system. The first subset of flight modes may include flight modes that are analogous to the autopilot flight modes of the second subset, and may also include modes for stabilization tasks and related tasks of reducing pilot workload. The first subset of flight modes may include modes for idling on the ground, maintaining a particular rate, maintaining a particular altitude, maintaining a particular ground speed, maintaining a particular airspeed, maintaining a hovering position, maintaining a position in three-dimensional space, performing autorotation, and the like.

The flight mode selected by the FCCs 205 may be thought of as a default flight mode, which is active when the pilot has not selected a flight mode with the instrument panel 241. The flight mode may be selected by the FCCs 205 according to input of the pilot flight controls, such as the cyclic stick 231 and/or the collective stick 233. For example, the flight mode may be automatically selected according to actuation of a beep switch on the pilot flight controls, or according to whether the pilot flight controls are in-detent or out-of-detent, or according to a change in position of the pilot flight controls, or according to a trim release function or button on the pilot flight controls. The flight mode may be selected by the FCCs 205 according to sensor samples from the aircraft sensors 207. The flight mode may be selected by the FCCs 205 according to one or more variables or states of the outer loop 313. The flight mode may be selected by the FCCs 205 according to data from an engine control unit (ECU) that controls the engines 115. The flight mode may be selected by the FCCs 205 according to data from other avionics systems of the rotorcraft lot, such as the instrument panel 241.

The FCCs 205 select a new active flight mode by transitioning between flights modes in the first subset of flight modes. The first subset of flight modes (e.g., the flight modes of the fly-by-wire control laws) has a set of transition conditions for transitioning from the current flight mode to a new flight mode. The conditions correspond to the different data and inputs discussed above. If the conditions for transitioning from the current mode to the new mode are met, then the transition is performed.

The FCCs 205 may also select the new active flight mode according to the current flight mode and any failure conditions that may have occurred. Occurrence of the failure conditions may be determined by the FCCs 205, or may be signaled to the FCCs 205 by the instrument panel 241. For example, if the current flight mode is a mode for maintaining or holding a particular ground speed, and a groundspeed measurement failure is detected, then the FCCs 205 may exit the groundspeed hold mode. Likewise, if the current flight mode is a mode for maintaining or holding a position, and a failure of the GPS system is indicated by the instrument panel 241, then the FCCs 205 may exit the position hold mode.

The flight mode selected by the instrument panel 241 may be an overriding flight mode, which is active when the pilot has selected it with the instrument panel 241. In some embodiments, a flight director (FD) or autopilot function of the rotorcraft 101 may be accessed through the instrument panel 241. In such embodiments, the second subset of the plurality of flight modes are different flight modes implemented by the flight director. The flight modes of the flight director may be flight modes that the pilot is familiar with from having used other rotorcraft that implement a similar instrument panel 241. Allowing flight modes to be selected with the switches of the flight director may allow the pilot experience to be consistent across newer and older rotorcraft for a pilot that is familiar with using the instrument panel 241 to select flight modes. During high workload situations, providing the pilot with a more consistent and familiar user experience may improve flight safety.

Figure 4:
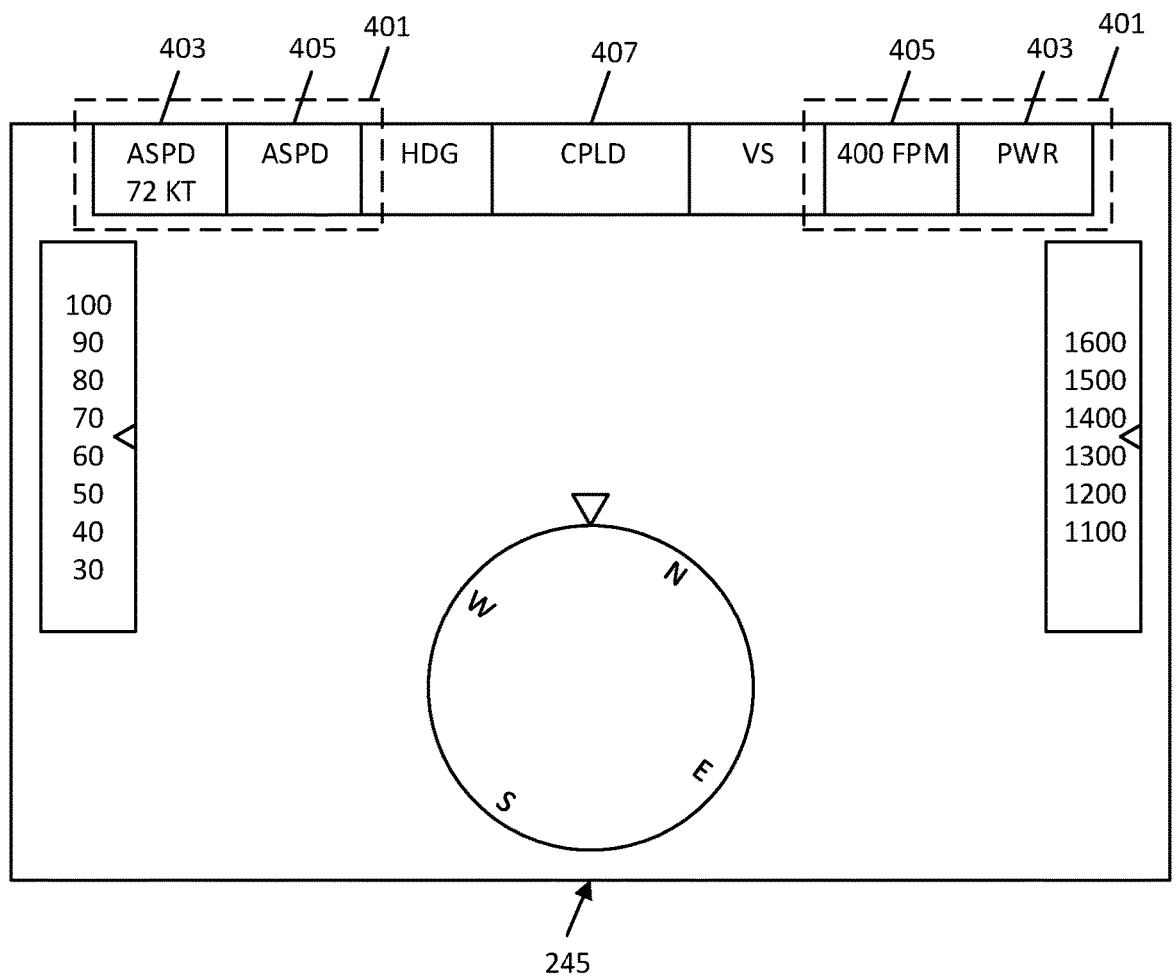
FIG. 4 is a detailed view of an instrument panel, according to some embodiments.
Figure 4:
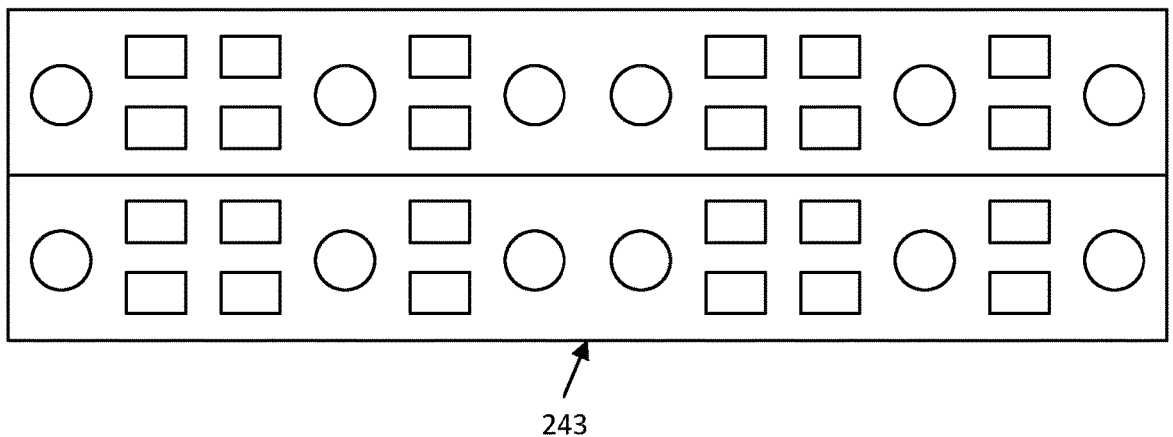

FIG. 4 is a detailed view of the instrument panel 241, which includes a switch panel 243 and display 245, in accordance with an embodiment. In an embodiment, the instrument panel 241 is a panel such as a Garmin® G1000™ or the like. The pilot interacts with the instrument panel 241 to control the various flight control systems of the rotorcraft 101.

The switch panel 243 may have one or more flight director mode selection keys, and the flight director (FD) or autopilot function of the rotorcraft 101 may be accessed through the flight director mode selection keys. The flight director mode selection keys correspond to one or more flight modes of the flight director for each axis of the rotorcraft 101. The switch panel 243 may be used by the pilot to manually select a flight mode from the second subset of the plurality of flight modes (e.g., modes of the flight director) and override any flight mode that may be currently selected from the first subset of the plurality of flight modes (e.g., modes selected by the CLAWS). The flight director mode selection keys may be buttons, keys, switches, or other interface features on a touchscreen.

The display 245 has axis indicators 401 for the axes of the rotorcraft lot. In some embodiments, the display 245 only has axis indicators 401 for some of the axes. For example, there may be axis indicators 401 corresponding to the altitude and the longitude. In other embodiments, the display 245 may have axis indicators 401 for all of the axes.

Each of the axis indicators has a first indicator 403 and a second indicator 405. The first indicator 403 is used to indicate that the current flight mode was selected from the first subset of flight modes. As such, the first indicator 403 may be shown when the CLAWS are controlling flight, and may also be referred to herein as the CLAWS indicator 403. The second indicator 405 is used to indicate that the current flight mode was selected from the second subset of flight modes. As such, the second indicator 405 may be shown when the flight director is controlling flight, and may also be referred to herein as the FD indicator 405. As further explained below, the flight director may be active but not controlling flight. In such situations, both the first indicator 403 and the second indicator 405 may be shown in different colors.

The first indicator 403 and the second indicator 405 may be alphanumeric displays that show a code corresponding to the flight mode. For example, if the CLAWS are controlling flight in an airspeed mode, then "ASPD" may be shown in the first indicator 403. Likewise, if the flight director is controlling flight in the mode for maintaining a particular airspeed, then "ASPD" may be shown in the second indicator 405. Some modes may also show further information in the indicator. Continuing the previous example, the indicators may also show the target airspeed in knots (KT).

The display 245 may further include a coupling indicator 407. The coupling indicator 407 may be used to indicate when the flight director is controlling flight (sometimes referred to as being "coupled" to the flight controls). When the flight director is coupled to the flight controls, an indication such as "CPLD" may be shown in the coupling indicator 407. When the CLAWS are controlling flight (e.g., the flight director is inactive), the coupling indicator 407 may not be shown, indicating that the flight director has been decoupled from control of the rotorcraft, or has otherwise relinquished control of a particular axis.

Figure 5:
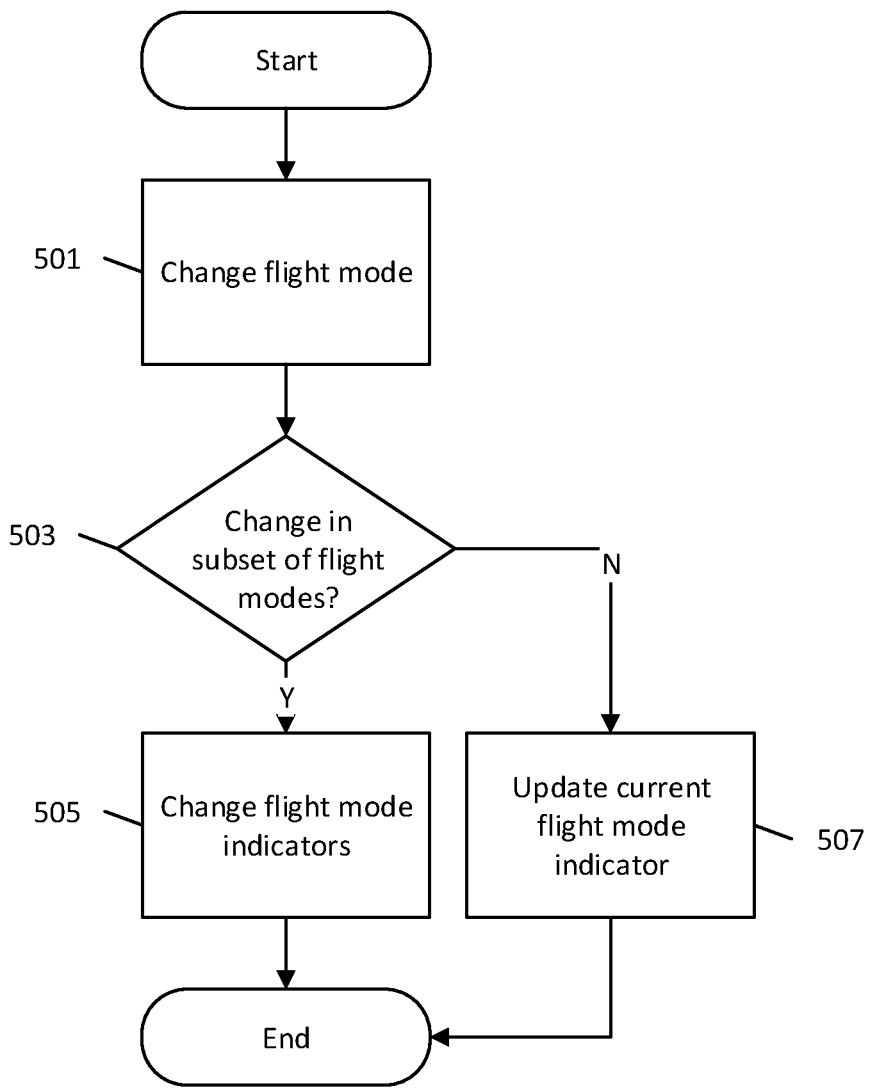
FIG. 5 illustrates a flow diagram for changing flight modes, according to some embodiments.

FIG. 5 illustrates a flow diagram for changing flight modes, according to an embodiment. The flow diagram shown in FIG. 5 is indicative of operations performed by the FCCs 205 when the flight mode for a particular axis is changed.

A change in flight mode is performed (step 501). The change may be caused by the FCCs 205 automatically selecting a new flight mode, e.g., with the CLAWS. The change may also be caused by the pilot selecting a flight mode, e.g., with the flight director.

If the flight mode is changed from a mode in one subset of flight modes to a mode in the other subset of flight modes (step 503), then the flight mode indicators are changed (step 505). For example, if the CLAWS were controlling flight, then the first indicator 403 would be shown before the flight mode change, corresponding to the first subset of flight modes that the CLAWS selects from. If the flight mode is changed by the pilot selecting a flight mode with the flight director, then the first indicator 403 would be turned off or no longer be shown, and the second indicator 405 would be turned on or shown after the flight mode is changed, corresponding to the second subset of flight modes that the flight director selects from. Turning the indicators on or off may include, e.g., showing or displaying relevant indicators on a user interface shown on a display of the instrument panel 241, or hiding the indicators on the user interface from the pilot.

If the flight mode is not changed to a mode in the other subset of flight modes (step 503), then the current flight mode indicator is updated (step 507). For example, if the CLAWS of the FCCs 205 automatically transitioned from a first flight mode to a second flight mode, then both the previous and new flight modes are from the same subset of flight modes (e.g., the first subset). As such, the flight mode indicator would not be changed, and the first indicator 403 would be shown before and after the flight mode change. Instead, the first indicator 403 may be updated to show a new value or code. Such a change indicates to the pilot that the system which is in control of the rotorcraft 101 has not changed, but indicates that the mode of that system has changed.

The FCCs 205 may indicate the selected flight mode using the display 245. In particular, the first indicator 403 associated with the first subset of flight modes may be used to indicate that the selected flight mode is from the first subset (e.g., the fly-by-wire control laws), and the second indicator 405 associated with the second subset of flight modes may be used to indicate that the selected flight mode is from the second subset (e.g., the flight director). Using different indicators allows the pilot to know whether the flight director or the CLAWS are currently controlling flight of the rotorcraft lot.

Figure 6:
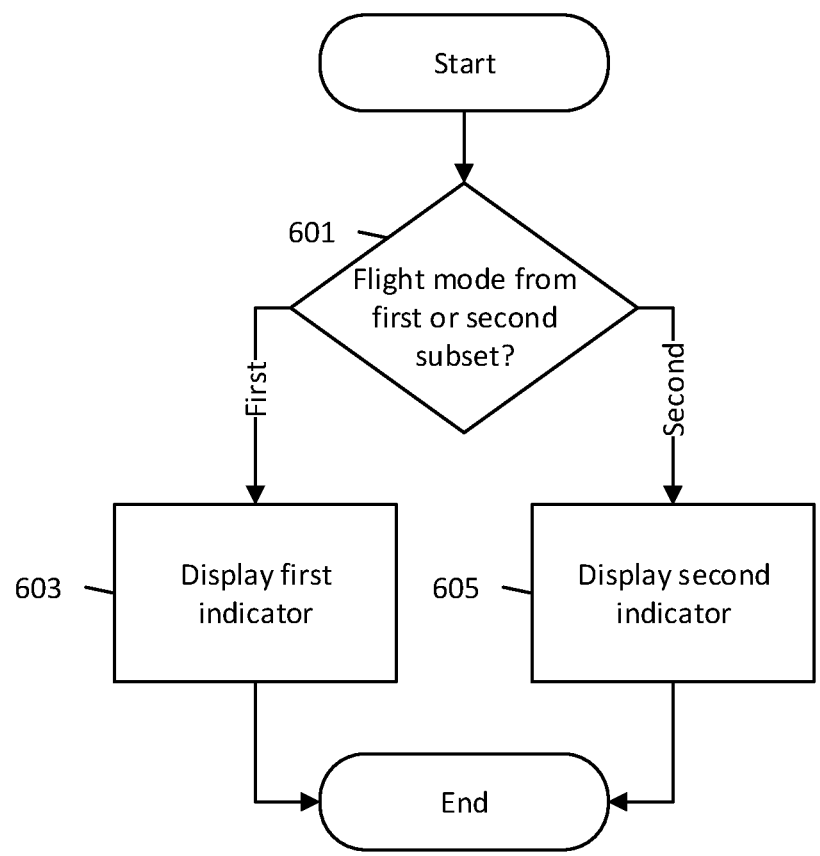
FIGS. 6-7 illustrate flow diagrams for indicating flight modes, according to some embodiments.

FIG. 6 illustrates a flow diagram for indicating flight modes, according to an embodiment. The flow diagram shown in FIG. 6 is indicative of operations performed by the FCCs 205 when changing the flight control indicators shown on the display 245 for a particular axis, such as in step 505, above. In particular, the operations may be performed when changing to a new flight mode. The operations may be performed after the flight mode is changed, or in conjunction with changing the flight mode.

A determination is made as to whether the new flight mode is from the first subset or the second subset (step 601). As explained above, if the FCCs 205 automatically selected the new flight mode (according to the CLAWS), it will be from the first subset; if the pilot selected the new flight mode (with the flight director), it will be from the second subset. If the new flight mode is from the first subset, then the first indicator 403 is shown (step 603). If the new flight mode is from the second subset, then the second indicator 405 is shown (step 605).

In some embodiments, the indicators are color-coded, and the colors of the indicators are changed to indicate which system is controlling flight of the rotorcraft lot. In an embodiment, a first color may be used for the indicator associated with the system that is currently in control. When the fly-by-wire control laws are in control, the first indicator 403 corresponding to the control laws is shown in the first color. When the flight director is in control, the second indicator 405 corresponding to the flight director is shown in the first color, and the first indicator 403 is hidden or not shown. In some embodiments, the flight director may be active but not in control of flight. In such embodiments, both indicators are shown: the first indicator 403 is shown in the first color (because the CLAWS control flight), and the second indicator 405 is shown in a second color different from the first color (because the FD is active but does not control flight). In an embodiment, the first color is green and the second color is magenta.

Figure 7:
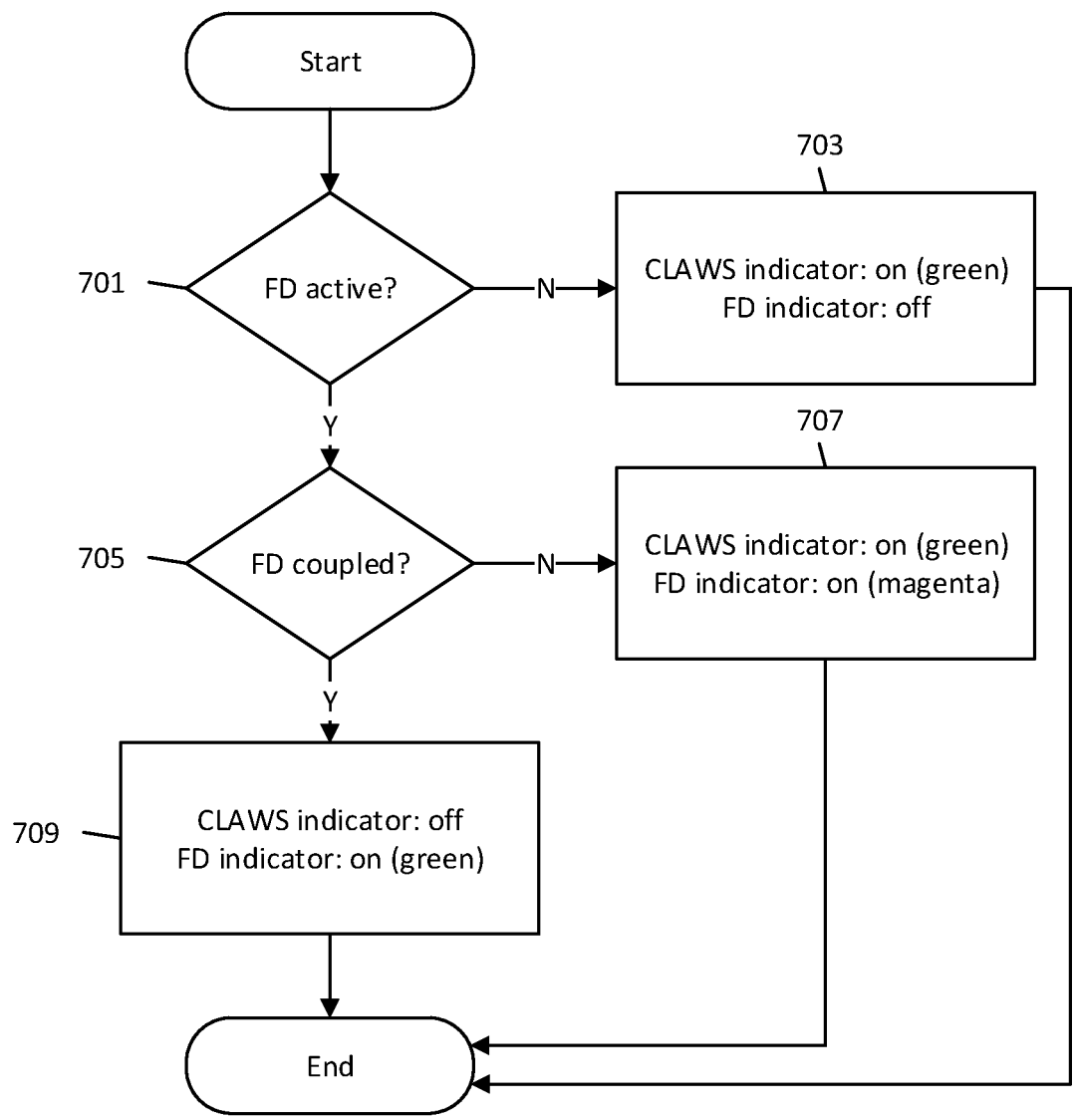
Figure 8A:
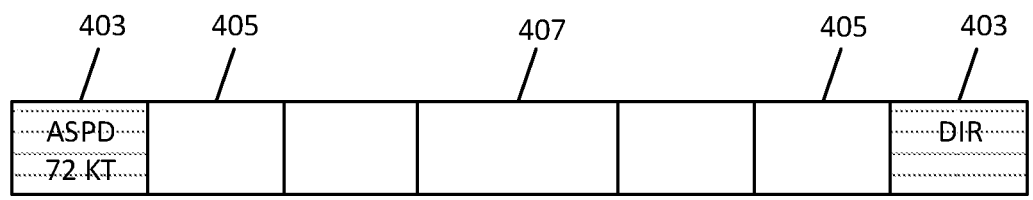
FIGS. 8A through 8C are various views of flight mode indicators, according to some embodiments.
Figure 8B:
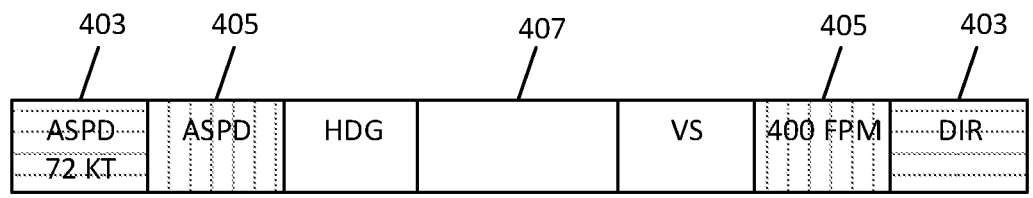
Figure 8C:
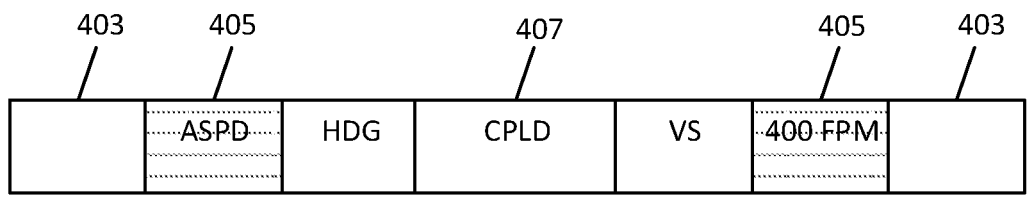

FIG. 7 illustrates a flow diagram for indicating flight modes, according to an embodiment. The flow diagram shown in FIG. 7 is indicative of operations performed by the FCCs 205 when determining which flight control indicators to show on the instrument panel 241 for a particular axis. FIGS. 8A through 8C are various views of the indicators on the display 245, and may be indicative of what the display shows when the various control systems of the rotorcraft 101 control flight. In FIGS. 8A through 8C, horizontal line hashing for an indicator illustrates the indicator being shown in the first color (e.g., green), and vertical line hashing for an indicator illustrates the indicator being shown in the second color (e.g., magenta).

If the flight director is not active (step 701), then the CLAWS indicator 403 is shown in green and the FD indicator 405 is not shown (step 703). This is because, as noted above, the CLAWS system may control flight when the FD is not active. Such a display configuration is shown in FIG. 8A. If the flight director is active but not coupled to the flight controls (step 705), then the CLAWS indicator 403 is shown in green and the FD indicator 405 is shown in magenta (step 707). This is because, although the FD is active, it is not controlling flight, and so the CLAWS system is still controlling flight. Such a display configuration is shown in FIG. 8B. If the flight director is coupled (step 705), then the CLAWS indicator 403 is not shown, the FD indicator 405 is shown in green, and the coupling indicator 407 is shown (step 709). This is because, as noted above, the FD overrides the CLAWS flight control system. Such a display configuration is shown in FIG. 8C.

In the methods shown in FIGS. 5 through 7, the current flight mode indicator may be changed or updated, for example, by the FCCs 205 in response to determining or detecting the change in flight mode. The determination may be made by a processor of the FCCs 205 in response to a flight control change signal from, e.g., the instrument panel 241. The FCCs 205 may perform the change or update by sending an indicator change signal to the instrument panel 241, which updates or changes the current flight mode indicator shown.

Figure 9A:
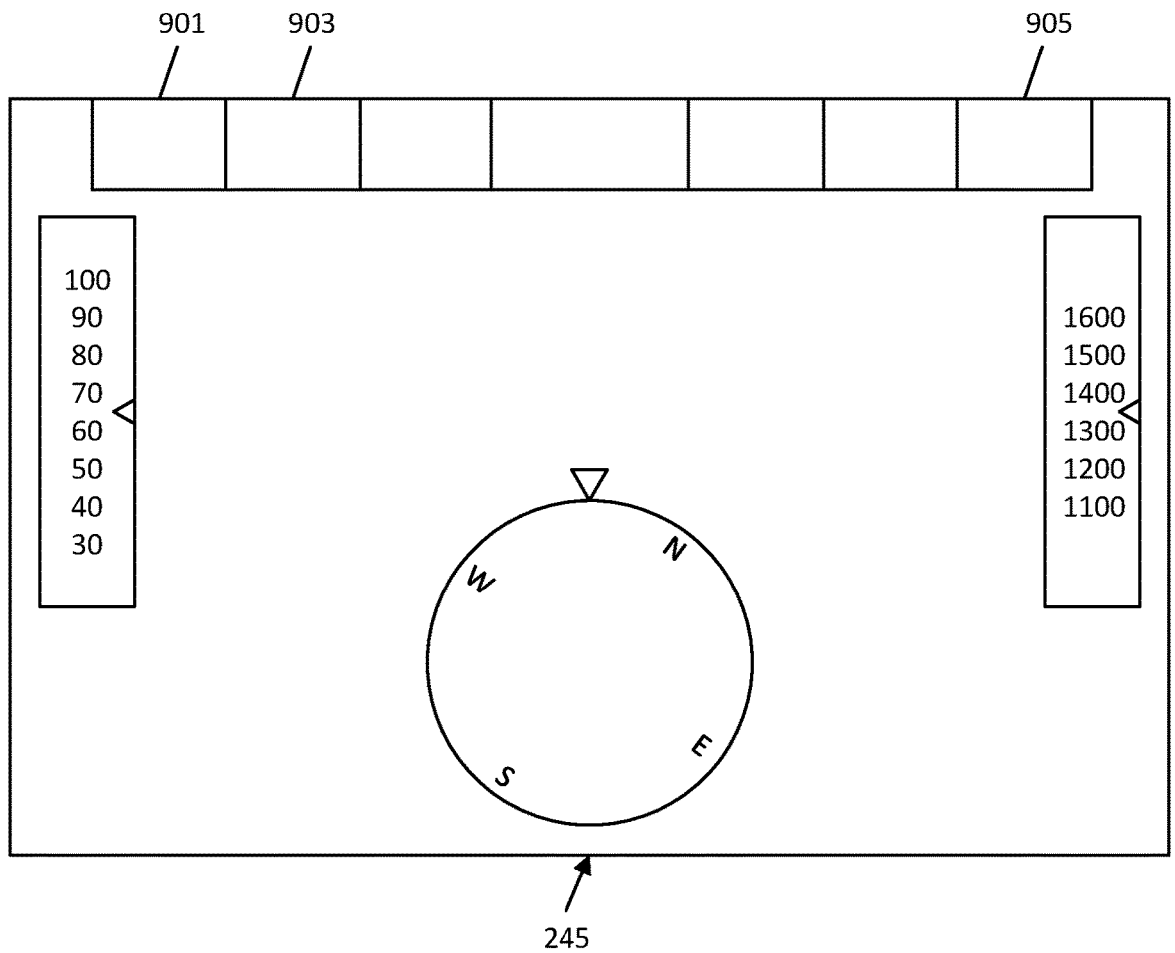
FIG. 9A is a detailed view of an instrument panel, according to some embodiments.
Figure 9A:
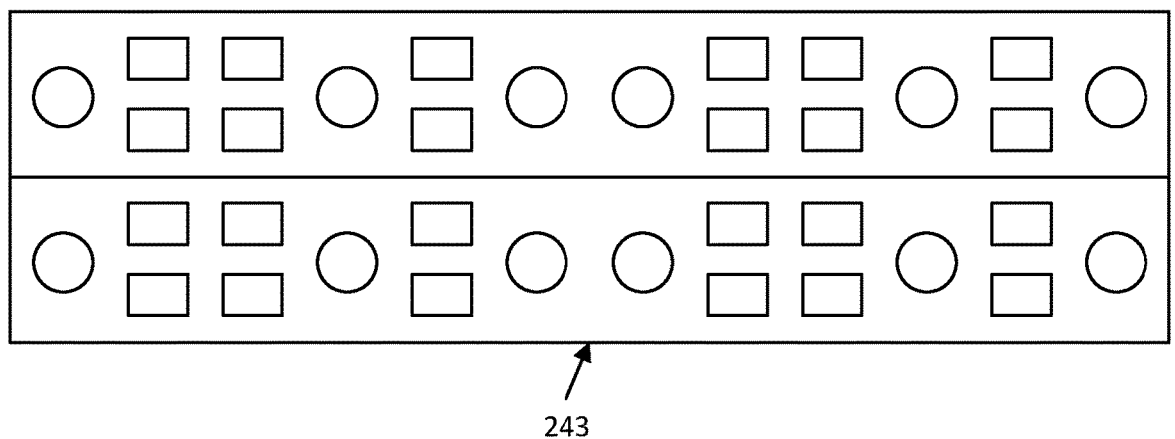

FIG. 9A is a detailed view of the instrument panel 241, which includes a switch panel 243 and display 245, in accordance with another embodiment. In the embodiment of FIG. 9A, the display 245 has axis indicators 901, 903, and 905 for all axes of the rotorcraft lot. Further, each of the axis indicators 901, 903, and 905 do not include multiple indicators. Rather, the axis indicators 901, 903, and 905 each have a single indicator that is used to indicate the current flight mode, regardless of whether it was selected from the first or second subset of flight modes. The embodiment of FIG. 9A may be used in embodiments where the flight modes in the first and second subset are mutually exclusive, e.g., where the first and second subset of flight modes may not have overlap in functionality.

Figure 9B:
FIG. 9B is a view of flight mode indicators, according to some embodiments.

In some embodiments, the indicators are color-coded, and the colors of the indicators are changed to indicate whether the current flight mode is controlling the rotorcraft lot. Some of the flight modes may not actually control the rotorcraft lot, but rather may provide suggestions to the pilot to help with flight. Such modes may be referred to as "guidance" modes. In some embodiments, controlling flight modes are shown in a first color, and guidance flight modes are shown in a second color different from the first color. In an embodiment, the first color is green and the second color is magenta. An example of this is shown in FIG. 9B, where the axis indicators 901 and 905 are showing the second color (indicating guidance modes), and the axis indicator 903 is showing the first color (indicating flight control along that axis).

Embodiments may achieve advantages. Indicating which system controls the rotorcraft may help the pilot be aware of what the rotorcraft is doing. Avoiding surprising behavior during an emergency situation may improve flight safety. By using the color green for the indicator corresponding to the system controlling flight, the system which is in control may be unambiguously indicated to the pilot.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft comprising:
    a rotor system producing thrust along an axis of the rotorcraft;
    a flight control computer operable to control flight of the rotorcraft along the axis according to an active flight mode of a plurality of flight modes for controlling flight of the rotorcraft, the flight control computer operable to select a first selected flight mode from a first subset of the plurality of flight modes according to one or more control laws; and
    an instrument panel electrically coupled to the flight control computer, the flight control computer operable to receive a flight mode selection signal from a flight director of the instrument panel in response to the flight director selecting a second selected flight mode from a second subset of the plurality of flight modes, the second subset different from the first subset;
    wherein the flight control computer is configured to:
        set the active flight mode to the first selected flight mode in response to the flight director not controlling flight of the rotorcraft, and to the second selected flight mode in response to the flight director and controlling flight of the rotorcraft;
        display a first indicator on the instrument panel in response to the active flight mode being set to the first selected flight mode from the first subset of the plurality of flight modes, the first indicator being a first color;
        display a second indicator on the instrument panel in response to the active flight mode being set to the second selected flight mode from the second subset of the plurality of flight modes, the second indicator being a second color, the second color different from the first color; and
        control flight of the rotorcraft along the axis according to the active flight mode.

2. The rotorcraft of claim 1, further comprising pilot flight controls electrically coupled to the flight control computer, wherein the flight control computer selects the first selected flight mode according to input from the pilot flight controls.

3. The rotorcraft of claim 2, wherein the pilot flight controls comprise a control stick coupled to a control stick detent sensor, the first selected flight mode selected according to a stick detent signal from the control stick detent sensor.

4. The rotorcraft of claim 2, wherein the pilot flight controls comprise a control stick coupled to a control stick movement sensor, the first selected flight mode selected according to a stick movement signal from the control stick movement sensor.

5. The rotorcraft of claim 1, further comprising aircraft sensors, wherein the flight control computer selects the first selected flight mode according to sensor samples from the aircraft sensors.

6. The rotorcraft of claim 1, further comprising an engine control unit (ECU), wherein the flight control computer selects the first selected flight mode according to data from the ECU.

7. The rotorcraft of claim 1, wherein the flight control computer selects the first selected flight mode according to data from the instrument panel.

8. The rotorcraft of claim 1, wherein the flight control computer selects the first selected flight mode according to states of control loops of a fly-by-wire control system of the rotorcraft.

9. The rotorcraft of claim 1, wherein the first indicator is not shown on the instrument panel in response to the active flight mode being set to the second selected flight mode and controlling flight of the rotorcraft.

10. A rotorcraft comprising:
    an instrument panel comprising one or more flight mode indicators; and
    a flight control computer configured to:
        detect a change in flight mode of the rotorcraft from a previous flight mode to an active flight mode, the active flight mode and the previous flight mode each being from one of a first subset or a second subset of a plurality of flight modes for controlling flight of the rotorcraft;
        determine whether the active flight mode and the previous flight mode are from different subsets of the plurality of flight modes; and
        update the one or more flight mode indicators in response to the active flight mode and the previous flight mode being from different subsets of the plurality of flight modes, wherein updating the one or more flight mode indicators comprises changing a color of the one or more flight mode indicators.

11. The rotorcraft of claim 10, wherein the flight control computer is configured to update the one or more flight mode indicators by:

displaying a first indicator of the one or more flight mode indicators in response to the active flight mode being from the first subset of the plurality of flight modes; and displaying a second indicator of the one or more flight mode indicators in response to the active flight mode being from the second subset of the plurality of flight modes, the second indicator being different from the first indicator.

12. The rotorcraft of claim 10, further comprising pilot flight controls, wherein the change in flight mode occurs in response to a change in position of the pilot flight controls.

13. The rotorcraft of claim 12, wherein the active flight mode is selected from the first subset of the plurality of flight modes in response to the change in position of the pilot flight controls.

14. The rotorcraft of claim 10, wherein the instrument panel further comprises a flight director, and wherein the change in flight mode occurs in response to selection of the active flight mode through the flight director.

15. The rotorcraft of claim 14, wherein the active flight mode is selected from the second subset of the plurality of flight modes in response to the selection of the active flight mode with the flight director.

16. The rotorcraft of claim 14, wherein the one or more flight mode indicators are color coded according to whether the flight director is controlling flight of the rotorcraft.

17. The rotorcraft of claim 16, wherein the one or more flight mode indicators include a first indicator and a second indicator, and wherein the flight control computer is configured to update the one or more flight mode indicators by:

displaying the first indicator and hiding the second indicator in response to the flight director being inactive;

displaying the first indicator and the second indicator in response to the flight director being active but not controlling flight of the rotorcraft; and displaying the second indicator and hiding the first indicator in response to the flight director being active and controlling flight of the rotorcraft.

18. The rotorcraft of claim 16, wherein the one or more flight mode indicators include a single indicator for an axis of the rotorcraft, wherein the active flight mode is shown in a first color using the single indicator for the axis in response to the active flight mode being from the first subset of the plurality of flight modes, and wherein the active flight mode is shown in a second color using the single indicator for the axis in response to the active flight mode being from the second subset of the plurality of flight modes, the second color being different from the first color.

19. A rotorcraft comprising:
one or more indicators;
a flight director; and
a flight control system comprising a flight control computer, the flight control computer configured to:
   determine whether the flight director is controlling flight of the rotorcraft;
   detect a change of a flight mode of the rotorcraft from a previous flight mode to a current flight mode, the current flight mode and the previous flight mode being from one of a first subset or a second subset of a plurality of flight modes for controlling flight of the rotorcraft, the current flight mode being from the second subset when the flight director is controlling flight of the rotorcraft, the current flight mode being from the first subset when the flight director is not controlling flight of the rotorcraft; and
   update the one or more indicators in response to detecting the change of the flight mode, the one or more indicators being a first color when the flight director is controlling flight of the rotorcraft, the one or more indicators being a second color when the flight director is not controlling flight of the rotorcraft.

20. The rotorcraft of claim 19, wherein the one or more indicators include a first indicator corresponding to the first subset of the plurality of flight modes, and a second indicator corresponding to the second subset of the plurality of flight modes, and wherein the flight control computer is configured to update the one or more indicators by changing the color of the one or more indicators.

21. The rotorcraft of claim 20, wherein the first indicator is a first color when the flight director is not controlling flight of the rotorcraft.

22. The rotorcraft of claim 20, wherein the second indicator is a first color when the flight director is controlling flight of the rotorcraft.

23. The rotorcraft of claim 20, wherein the first indicator is a first color and the second indicator is a second color when the flight director is active but not controlling flight of the rotorcraft.

* * * * *